US008169937B2

(12) United States Patent
Kuusinen et al.

(10) Patent No.: US 8,169,937 B2
(45) Date of Patent: *May 1, 2012

(54) MANAGING A PACKET SWITCHED CONFERENCE CALL

(75) Inventors: Jarmo Kuusinen, Jyvaskyla (FI); Ari Lakaniemi, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 631 days.

This patent is subject to a terminal disclaimer.

(21) Appl. No.: 12/348,445

(22) Filed: Jan. 5, 2009

(65) Prior Publication Data

US 2009/0109879 A1    Apr. 30, 2009

Related U.S. Application Data

(63) Continuation of application No. 10/613,986, filed on Jul. 3, 2003, now Pat. No. 7,483,400.

(30) Foreign Application Priority Data

Jul. 4, 2002  (WO) .................. PCT/IB02/002625

(51) Int. Cl.
*H04M 3/42* (2006.01)
*H04L 12/16* (2006.01)

(52) U.S. Cl. ........ 370/267; 370/261; 370/265; 370/269; 379/203.01; 379/205.01; 379/206.01; 379/207.01

(58) Field of Classification Search .......... 370/261–269; 379/202.01–207.01
See application file for complete search history.

(56) References Cited

U.S. PATENT DOCUMENTS

| | | | |
|---|---|---|---|
| 6,262,979 B1 | 7/2001 | Anderson et al. | |
| 6,418,125 B1 | 7/2002 | Oran | |
| 6,463,414 B1 | 10/2002 | Su et al. | |
| 6,466,550 B1 * | 10/2002 | Foster et al. | 370/261 |
| 6,628,767 B1 | 9/2003 | Wellner et al. | |
| 6,697,341 B1 | 2/2004 | Roy | |
| 6,728,358 B2 | 4/2004 | Kwan | |
| 6,826,159 B1 | 11/2004 | Shaffer et al. | |

(Continued)

FOREIGN PATENT DOCUMENTS
WO    WO 00/33508    6/2000
(Continued)

OTHER PUBLICATIONS

"RTP: A Transport Protocol for Real-Time Applications" by H. Schulzrinne et al. Jan. 1996.

(Continued)

*Primary Examiner* — Lisa Hashem

(57) ABSTRACT

The invention relates to a method for managing a packet switched, centralized conference call between a plurality of terminals 13. In order to enable an enhancement of the user comfort, it is proposed that the method comprises at a conference call server 12 receiving data packets from all terminals 13. Based on these data packets, then at least one terminal 13 currently providing voice data is determined. In a next step, the data received in the data packets is mixed, and the mixed data is inserted into new data packets together with at least one identifier associated to one of the terminals 13 which were determined to provide voice data, such that the at least one identifier can be distinguished from any other information in the data packets. Finally, the new data packets are transmitted to terminals 13 participating in the conference call. The invention relates equally to a, corresponding server and to a corresponding terminal

21 Claims, 4 Drawing Sheets

U.S. PATENT DOCUMENTS

| | | | |
|---|---|---|---|
| 6,940,826 B1 * | 9/2005 | Simard et al. | 370/260 |
| 6,956,828 B2 | 10/2005 | Simard et al. | |
| 6,976,055 B1 | 12/2005 | Shaffer et al. | |
| 7,006,616 B1 | 2/2006 | Christofferson et al. | |
| 7,046,780 B2 * | 5/2006 | Kwan | 379/202.01 |
| 7,145,884 B2 * | 12/2006 | Li | 370/263 |
| 7,292,543 B2 * | 11/2007 | Li | 370/260 |
| 7,453,829 B2 * | 11/2008 | Pasha et al. | 370/261 |
| 7,460,495 B2 * | 12/2008 | Li | 370/267 |
| 7,483,400 B2 * | 1/2009 | Kuusinen et al. | 370/267 |
| 7,573,868 B2 * | 8/2009 | Cutler et al. | 370/352 |
| 7,899,170 B2 * | 3/2011 | Jeong et al. | 379/202.01 |
| 2002/0044534 A1 * | 4/2002 | Cohen | 370/263 |
| 2002/0064164 A1 | 5/2002 | Barany et al. | |
| 2003/0185369 A1 | 10/2003 | Oliver et al. | |
| 2005/0076081 A1 | 4/2005 | Rui et al. | |
| 2006/0067500 A1 * | 3/2006 | Christofferson et al. | 379/202.01 |
| 2006/0245379 A1 * | 11/2006 | Abuan et al. | 370/261 |
| 2007/0153712 A1 * | 7/2007 | Fry et al. | 370/263 |
| 2008/0059165 A1 * | 3/2008 | Furuta et al. | 704/226 |
| 2009/0245539 A1 * | 10/2009 | Vaudrey et al. | 381/109 |
| 2010/0208626 A1 * | 8/2010 | Hamasaki et al. | 370/260 |
| 2011/0116409 A1 * | 5/2011 | Jeong et al. | 370/252 |
| 2011/0200183 A1 * | 8/2011 | Erhart et al. | 379/202.01 |

FOREIGN PATENT DOCUMENTS

| | | |
|---|---|---|
| WO | WO 00/72560 | 11/2000 |
| WO | WO 00/72563 | 11/2000 |

OTHER PUBLICATIONS

3$^{rd}$ Generation Partnership Project; Technical Specification Group Services and System Aspects; Mandatory Speech Codec speech processing functions; AMR Speech Codec; General Description (Release 4), 3GPP TS 26.071 V4.0.0 (Mar. 2001).

International Search Report for PCT/IB2002/002625 completed Feb. 5, 2003.

International Preliminary Report on Patentability for PCT/IB2002/002625 completed Sep. 9, 2004.

Translation of Japanese Office Action in corresponding Japanese Application No. 2004-519028 dated Jun. 26, 2006.

EPO Communication for Application No. 02 741 069.5 dated Feb. 8, 2007.

EPO Communication for Application No. 02 741 069.5 dated Aug. 30, 2006.

English translation of first Office Action issued in corresponding Chinese Application No. 02829259.6 dispatched on Sep. 19, 2008.

English translation of second Office Action issued in corresponding Chinese Application No. 02829259.6 dispatched on Apr. 17, 2009.

English translation of Office Action issued in corresponding Korean Application No. 10-2005-7000081 issued Nov. 27, 2008.

* cited by examiner

| V | P | X | CC | M | PT | SEQUENCE NUMBER |
|---|---|---|---|---|---|---|
| | | | | | | TIMESTAMP |
| | | | | | | SSRC |
| | | | | | | CSRC LIST |

MANAGING A PACKET SWITCHED CONFERENCE CALL

CROSS-REFERENCE TO RELATED PATENT APPLICATIONS

This application is a Continuation of U.S. patent application Ser. No. 10/613,986 filed Jul. 3, 2003, which claims priority from PCT Application No. PCT/IB2002/002625 filed Jul. 4, 2002, both of which are incorporated herein by reference in their entirety.

FIELD

The invention relates to a method for managing a packet switched centralized conference call between a plurality of terminals. The invention relates equally to a conference call server comprising means for managing a centralized conference call and to a terminal comprising means for participating in a centralized conference call.

BACKGROUND

In a conference call, a group of terminal users is connected together in a way that when one of the participating users talks, all other participating users are able to hear the voice of the talking participant. In such a kind of communication, normally only one of the participating users is talking at a time, while the other users are listening. In a centralized conference call, the terminals of the participating users are not connected directly with each other, but via a conference call server. A centralized conference call can be realized for instance by a Voice over Internet Protocol (VoIP) conference call application in the Internet or as voice conferencing in Universal Mobile Telecommunication Services (UMTS) network's packet switched domain.

In a VoIP session, the voice data is typically carried by using the Real-time Transport Protocol (RTP) on top of the Internet Protocol (IP) and the User Datagram Protocol (UDP). RTP has been described in detail in RFC 1889: "RTP: A Transport Protocol for Real-Time Applications", January 1996, by H. Schulzrinne et al.

An end-to-end VoIP connection is often called a VoIP tunnel. In a typical centralized conference call set-up, VoIP tunnels are formed between each participating terminal and the conference call server.

For illustration, the tunneling of coded voice in a centralized, RTP based conference call is presented in FIG. 1.

FIG. 1 schematically shows a centralized conference call system in a packet switched domain of UMTS network 11, with a conference call server 12 connected to this network 11 and with a plurality of mobile terminals 13. The mobile terminals 13 are connected to the conference call server via the UMTS network 11 using RTP tunnels 14.

At the terminals 13, voice data produced by the respective user of the terminals 13 is first encoded and then inserted to the payload of RTP packets. There is a multitude of alternative audio coders that can be used to perform the actual voice coding. For example, the Adaptive Multirate (AMR) speech codec, which is specified as the mandatory speech.codec for the 3rd generation systems, could be used to compress the speech data carried inside the RTP payload. The coders encode the speech samples to frames, which are then carried over the RTP/UDP/IP protocols via the UMTS network 11 to the conference call server 12.

The conference call server 12 comprises an RTP mixer 15, which receives the incoming RTP packet flows from the connected terminals 13, removes the RTP packaging, combines the flows into a single flow of RTP packets and then sends this flow to each of the terminals 13.

To each RTP packet transmitted between the terminals 13 and the conference call server 12, a header is associated. The structure of this header, which is specified in the above cited RFC 1889, is illustrated in FIG. 2. The header comprises a field V which identifies the version of the employed RTP and a field P for a padding bit. If the padding bit is set, the packet contains one or more additional padding octets at the end which are not part of the payload. The header further comprises a field X for an extension bit. If the extension bit is set, the fixed header is followed by exactly one header extension. The header moreover comprises a field CC for a Contributing Source (CSRC) count, which contains the number of CSRC identifiers that follow the fixed header, and a field M for a marker bit, the interpretation of the marker being defined by a profile. In addition, the header comprises a field PT for identifying the format of the payload and a field for a Sequence Number, which increments by one for each RTP data packet sent. The Sequence Number may be used by the receiver to detect a packet loss and to restore the packet sequence. The header also comprises a field for a Timestamp, which reflects the sampling instant of the first octet in the RTP data packet.

Furthermore, the RTP packet headers carry a Synchronisation Source (SSRC) identifier and, as mentioned above with reference to the CC field, a list of Contributing Source (CSRC) identifiers.

The SSRC identifier is used to identify the synchronization source that has transmitted the RTP packet in question. An SSRC identifier which is unique for the respective RTP session is associated randomly to each possible source, i.e. to each of the terminals 13 and to the conference call server 12. Each terminal 13 adds the SSRC identifier associated to it to the SSRC identifier field in the RTP header of each RTP packet it assembles. Equally, the RTP mixer 15 of the conference call server 12 adds the SSRC identifier associated to the conference call server 12 to the SSRC identifier field in the RTP header of each RTP packet leaving the server 12.

The CSRC list is used to identify different sources contributing to an RTP packet and is thus only of relevance for the RTP packets assembled in the conference call server 13. The RTP mixer 15 adds the SSRC identifiers of those terminals 13 contributing to the combined outbound VoIP flow to the CSRC fields of outgoing RTP packets. In order to enable a control of the VoIP connections using RTP, in addition a Real Time Control Protocol (RTCP) is defined in the above cited RFC 1889. RTCP is used for instance to keep both ends of a connection informed about the quality of service they are providing and receiving. This information is sent in RTCP sender report (SR) and receiver report (RR) packet types. In addition, the RTP specification defines an RTCP source description (SDES) packet type. RTCP SDES packets can be used by the source to provide more information about itself. SDES CNAME or NAME packets can be used for example to provide a mapping between the random SSRC identifier and the source identity. SDES CNAME packets are intended for providing canonical end-point identifiers, while SDES NAME packets are intended for providing a real name used to describe the respective source. The RTP mixer 15 is expected to combine SR and RR type RTCP packets from all terminals 13 before forwarding them. The SDES type RTCP packets, in contrast, are forwarded by the RTP mixer 15 to all conference participants 13 without modifications.

In a conference call it is sometimes difficult for the participating users to recognize immediately who is speaking. This is in particular a problem, in case there are many participating users in a conference call, while these participating users do not know each other very well.

The above cited RFC 1889 states that an example application is audio conferencing where a mixer indicates all the talkers whose speech was combined to produce the outgoing packet, allowing the receiver to indicate the current talker, even though all the audio packets contain the same SSRC identifier, i.e. that of the mixer.

In any sensible VoIP usage of a speech codec, however, the codec will send out Silence Descriptor (SID) frames enabling a comfort noise generation at the receiving end, as long as the respective conference participant is inactive, i.e. listening. Thus, all sources will always produce a signal that is transmitted to the conference call server 12. The conference call server 12 decodes VoIP flows received from each of the participants back to speech or to SID frames for summation before encoding the outbound speech and SID frames that will be transmitted to the terminals 13. This implies that the SSRC identifiers of all terminals 13 are included by the mixer 15 into the CSRC list of the outgoing mixed RTP packets, and therefore it is impossible for the receiving terminals 13 to distinguish active from inactive participants. It has to be noted that it has also its benefits to include the SSRC identifiers of all participating terminals 13 in the CSRC list, e.g. in order to keep each participating user up to date about the number and identity of all other users participating in the conference.

SUMMARY

It is an object of the invention to enhance the comfort of a user participating in a voice over IP conference call.

This object is reached according to the invention with a method for managing a packet switched, centralized conference call between a plurality of terminals, which comprises as a first step receiving at a conference call server data packets from all terminals participating in the conference call. These data packets include voice data or background noise information and an identifier associated to the respective terminal providing the voice data or the background noise information. In a second step, at least one terminal currently providing voice data, if any, is determined among the terminals participating in the conference call based on the received data packets. Obviously, in case none of the users participating in the conference call is talking for a while, none of the terminals will provide voice data for a while, and no terminal can be determined which provides voice data. In a third step, the received voice data and the background noise information is mixed and inserted into new data packets together with at least one identifier associated to one of the terminals which were determined to provide currently voice data, if any. The identifier is included in a data packet in a way it can be distinguished from any other included information. This implies in particular that the at least one identifier can be distinguished from other possibly included identifiers which are not necessarily associated to terminals providing voice data. Finally, the new data packets are transmitted by the conference call server to terminals participating in the conference call.

The object of the invention is equally reached with a conference call server comprising means for realizing the proposed method.

In addition, the object of the invention is reached with a terminal which comprises means for participating in a centralized conference call, which means are suited to make use of the information transmitted according to the invention by a conference call server. The terminal comprising to this end means for receiving data packets transmitted by a conference call server. The data packets comprise mixed voice data and/or background noise information provided by terminals participating in the conference call and at least one identifier associated to a terminal that was determined in the conference call server to currently provide voice data, if any. Moreover, the terminal comprises means for recognizing in received data packets identifiers associated to terminals that were determined in a conference call server to currently provide voice data. Further, the terminal comprises means for pointing out to a user an identification of terminals providing voice data based on recognized identifiers associated to terminals that were determined in a conference call server to currently provide voice data.

The invention proceeds from the idea that a conference call server can be designed to be able to distinguish between those participants of a conference call which are currently active, i.e. which provide voice data, and those which are currently inactive, i.e. which provide only background noise information. The invention further proceeds from the idea that a terminal can be designed to be able to point out to a user currently active participants of a conference call, in case it receives a corresponding information. Therefore, it is proposed that a conference call server performs a determination of the currently active participants of a conference call and that the server forwards a corresponding, distinguishable indication to the terminals participating in the conference call.

It is an advantage of the invention that it enables an improved user interface of a terminal, since transmitted information on the active conference participant can be presented to the user. The participants of the conference call can thus always identify the active speaker among all participants.

The identifiers of active terminals can be transmitted by the conference call server in a variety of ways.

In a first alternative, the conference call server transmits in each combined data packet exclusively an identifier associated to those terminals, which are currently active. It is an advantage of this approach that the receiving terminals are able to indicate all active talkers to their users, even in case of multiple simultaneous talkers. With this approach, however, the receiving terminals are not able to keep their users up to date about all participants.

In a second alternative, the conference call server transmits in each combined data packet identifiers for all terminals participating in the conference, but in such a way that an identifier associated to an active terminal is always listed at a predetermined place in the list of identifiers, for example as the first element in the list. While this approach constantly provides up to date information about all conference participants, it does not allow to indicate more than one active terminal simultaneously. However, in a sensible discussion, especially over a telephone connection, only one participant will be talking at a time and this problem can be considered to be a minor one.

A third alternative is given by a refinement of the second approach. In this third approach, the conference call server always transmits again in each combined data packet identifiers for all terminals participating in the conference. The identifiers associated to the currently active terminals are listed at the beginning of the list of identifiers. In addition, some marker is inserted in between the identifiers associated to currently active terminals and the identifiers associated to currently inactive terminals. This third approach combines the advantages of the first and the second approach, simply by introduction one additional value that has to be transmitted.

The identifier associated to a respective terminal might not be suited by itself to identify a transmitting terminal at a receiving terminal, like e.g. the randomly distributed SSRC identifier. In this case, preferably a mapping of the identifiers to a clear identification of the respective terminal is first transmitted from all possible transmitting terminals to the conference call server and further on to all possible receiving terminals. Then, each receiving terminal is able to map a later received identifier associated to a transmitting terminal to a corresponding identification of this terminal. The identification can be in particular a SIP address or a telephone number. The receiving terminal may also be able to further map the determined identification to another kind of identification. In case the identification is e.g. a SIP address or telephone number, the terminal may map this address or number to a name or an image stored in a directory of the receiving terminal.

In case all participants of the conference call are presented to the user of a terminal, the active participants can be pointed out to a user in any suitable manner.

The invention can be employed in particular, though not exclusively, in a system in which centralized conference calls are based on the RTP defined in the above cited RFC 1889. In this case, the data packets transmitted from the terminals to the conference call server and from the conference call server to the terminals are RTP packets. The identifiers of terminals transmitted by the conference call server in the combined RTP packets can be advantageously SSRC identifiers added to the CSRC list of the RTP header. In the third alternative presented for the transmission of identifiers by the conference call server, the employed marker can be for example the SSRC identifier associated to the conference call server. Since the SSRC identifier associated to the conference call server is transmitted anyhow in the SSRC field of the RTP header of each combined RTP packet, the receiving terminals have knowledge of this value and can use it for separating in the CSRC list active terminals from inactive terminals. In conventional applications, in contrast, the SSRC identifier associated to the conference call server is only included in the SSRC field of the outgoing combined RTP packets, not in the CSRC list, since the conference call server itself does not contribute to the combined RTP flow.

Each of the three alternatives presented for the transmission of identifiers by the conference call server complies with the current RTP specification and would not harm implementations that are not designed to make use of the special SSRC/CSRC handling.

A comprehensive embodiment of the method according to the invention implemented in an RTP based system advantageously comprises three parts. A first part comprises a mechanism for the terminals participating in a conference call to exchange RTP source identifiers and to map those identifiers to the respective identity of each terminal or terminal user by means of RTCP SDES packets. A second part comprises a mechanism implemented in the conference call server for setting the CSRC field of RTP headers according to predefined rules. A third part comprises a mechanism implemented in the participating receiving terminals for mapping the identifiers in the CSRC field of the RTP packet headers to terminal or user identities, in order to enable a presentation of the identity of the currently active speaker to the users of the receiving terminals.

It is to be noted that the number of identifiers that can be transmitted by the conference call server to the participating terminals and/or the number of participants that can be presented by the receiving terminals may be limited to a predetermined value. According to the above cited RFC 1889, for example, the CSRC list is limited to a maximum number of 15 entries.

The invention can be employed in particular for Internet or UMTS packet switched voice conferencing. In case of UMTS, the information on the active participants can be shown e.g. on the screen of a mobile terminal.

BRIEF DESCRIPTION OF THE DRAWINGS

Other objects and features of the present invention will become apparent from the following detailed description considered in conjunction with the accompanying drawings, wherein:

FIG. 2 illustrates the structure of an RTP header; and

DETAILED DESCRIPTION

Figure 1:
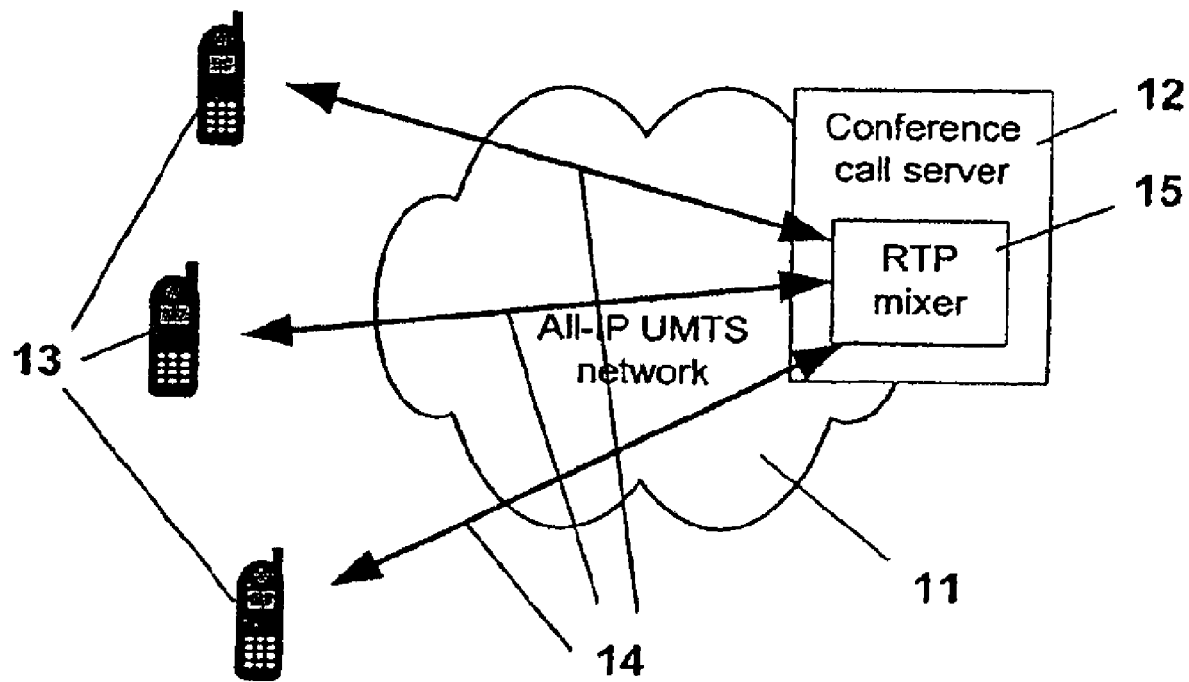
FIG. 1 illustrates the principle of an RTP based, centralized conference call system.

An embodiment of the method according to the invention will now be described with reference to FIGS. 1 to 3.

The embodiment supports the management of VoIP conference calls and is implemented in an RTP based system which comprises a UMTS network 11, a conference call server 12 including an RTP mixer 15 connected to the network 11 and a plurality of terminals 13. The terminals 13 can be connected to the conference call server 12 via the UMTS network 11 by means of RTP tunnels 14. The system thus corresponds in general to the system illustrated in FIG. 1, which has already been described above.

For setting up a VoIP conference call in this system, the Session Initiation Protocol (SIP) is used as signaling protocol. SIP is used together with the Session Description Protocol (SDP) to send invitations to the called parties and to agree on the voice codecs etc. The users of the terminals 13 join the conference either by initiating the session themselves by sending the SIP INVITE message to the conference call server 12 or by replying to INVITE messages received via the conference call server 12.

At the beginning of an initiated conference session, the conferencing software in each terminal 13 sends RTCP SDES packets to the conference call server 12. These SDES packets carry the SSRC identifier associated to the respective terminal 13 for this session and in addition in the SDES items field the SIP address or the phone number of the respective terminal 13. The conference call server 12 forwards the received SDES packets to each terminal 13 participating in the conference call. Based on the information in these SDES packets, the terminals 13 are prepared to map SSRC identifiers received during the conference session to corresponding SIP addresses or phone numbers.

When the conference session is active, all terminals 13 participating in the conference transmit RTP packets to the conference call server 12. The terminals 13 employ to this end a speech code, e.g. the AMR speech codec, in such a way that they transmit at a normal rate when there is speech at the input, i.e. when the user of the terminal 13 is talking, and with a reduced rate, when the source is silent, i.e. when the user of the terminal 13 is listening to the other participants. In the first case, the speech codec encodes voice data and transmits it in the payload of the RTP packet. In the latter case, the speech codec produces and transmits SID frames carrying a background-noise estimate which is needed for the comfort noise generation at the receiver. In this case this receiver is the conference call server 12.

The RTP mixer 15 of the conference call server 12 decodes all incoming streams, in order to enable a summation of the decoded speech and an encoding of the combined speech. Based on the respectively employed data rate, the conference call server 12 obtains as a side information of the decoding process an indication on whether the decoded signal is speech or a background noise estimate.

Thereafter, the RTP mixer 15 of the conference call server 12 mixes the decoded voice data and the background noise estimates from all sources 13 together and assembles RTP packets with an encoded combined data flow. Each assembled RTP packet comprises an RTP header having a structure which corresponds to the structure illustrated in FIG. 2, which has already been described above. Thus, each RTP header comprises a field for an SSRC identifier and a field for a CSRC list.

The RTP mixer 15 inserts the SSRC identifier associated to the conference call server 12 for the current conference call to the SSRC identifier field of the RTP headers of the outbound RTP packets, since the conference call server 12 is the source for these RTP packets.

Moreover, the RTP mixer 15 includes the SSRC identifiers associated to those terminals 13 contributing to the combined RTP packets in the CSRC list of the RTP headers. Since all terminals 13 participating in the conference call always transmit RTP packets to the conference call server 12, either with voice data or with a background noise estimate, the CSRC list thus always comprises the SSRC identifiers for all participating terminals 13. The RTP mixer 15 takes care, however, that the SSRC identifiers which are associated to the actively participating terminals 13 are included as first elements in the CSRC list.

Additionally, the RTP mixer 15 inserts also the SSRC identifier associated to the conference call server 12 to the CSRC list. More specifically, the SSRC identifier associated to the conference call server 12 is included as a marker between the SSRC identifiers associated to the active terminals 13 located at the beginning of the CSRC list and the SSRC identifiers associated to the inactive terminals 13 located at the end of the CSRC list.

The conference call server 12 then forwards the composite flow to each participating terminal 13.

The terminals 13 receive the RTP packets transmitted by the conference call server 12 via the UMTS network 14 and retrieve the SSRC identifiers included in the respective CSRC list of the headers of the RTP packets. Based on the mapping information received earlier, the terminals 13 then determine the SIP addresses or the phone numbers corresponding to the SSRC identifiers retrieved from the CSRC list. The terminals 13 do not perform such a mapping for the SSRC identifier which is associated to the conference call server 12. This SSRC identifier is recognized by the terminals 13 based on the identical SSRC identifier included in the SSRC identifier field of the RTP header The terminals 13 further determine names which are associated in their internal address directories to the determined SIP addresses or phone numbers, as far as available. The determined names are then presented to a respective user on the display of the terminals 13 in form of a list.

Figure 3:
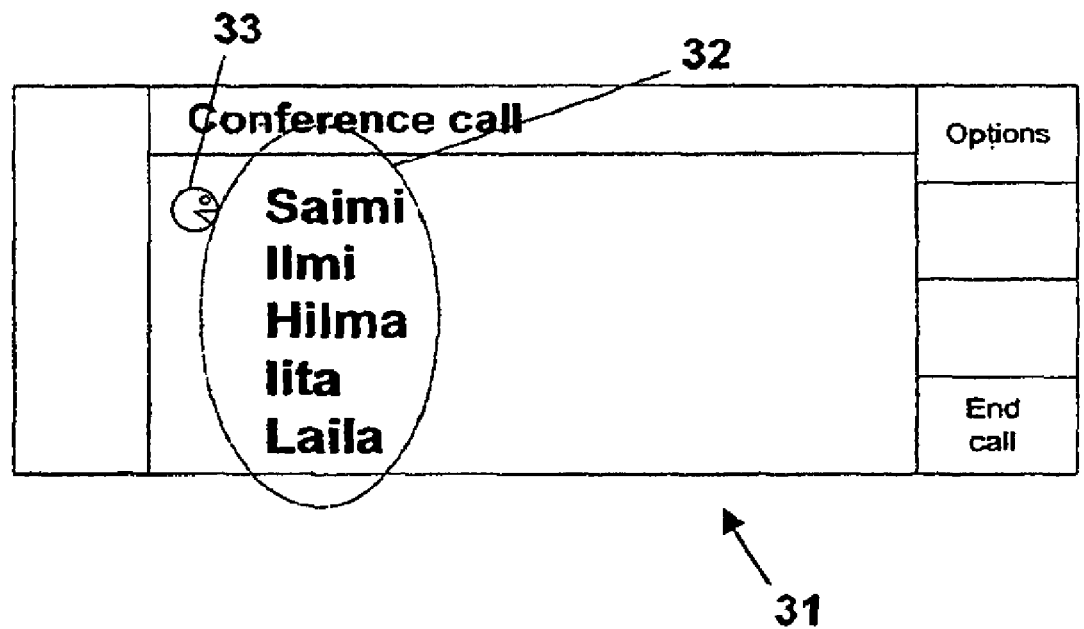
FIG. 3 shows a user interface of a terminal, which is making use of an embodiment of the method according to the invention.

FIG. 3 shows an embodiment of such a display 31, which presents beside other information and options a list 32 with the names of users participating in an on-going conference call.

In addition, the terminals 13 determine all those SSRC identifiers in the CSRC list which are listed before the SSRC identifier associated to the conference call server 12. The names which were determined for those SSRC identifiers belong to currently active participants and are pointed out in the presented list 32 on the display 31. In the example of FIG. 3, a special speaker indicator icon 33 is employed for indicating the participants who are currently speaking. In the presented situation, only one participant is currently talking, and a speaker indicator icon 33 is located next to the corresponding name, "Salmi", in the list 32.

Thus, the user of a terminal 13 is always able to see an identification of all users participating in the conference call, and to distinguish the currently speaking participants from the inactive participants.

Figure 4:
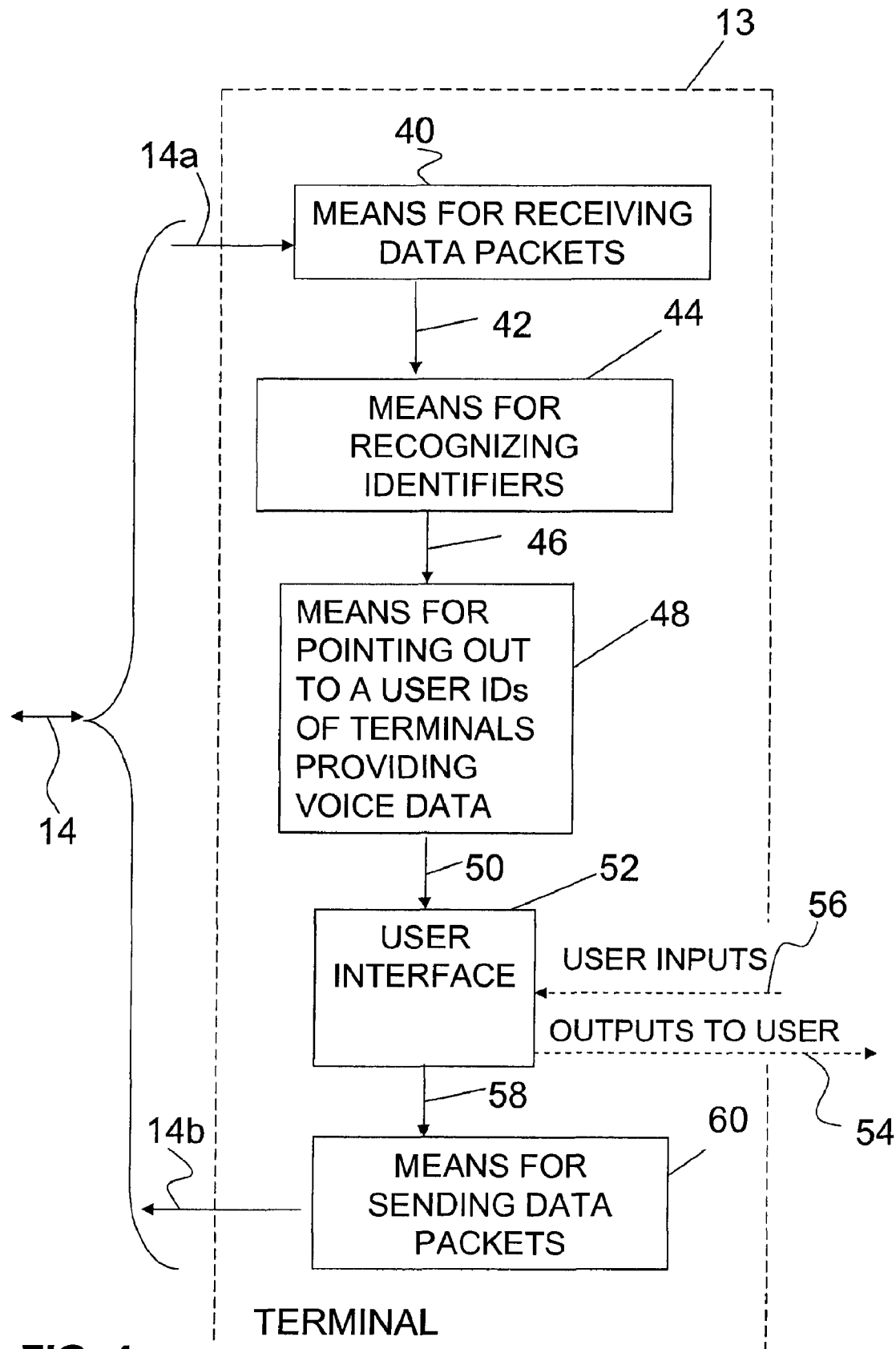
FIG. 4 shows a terminal according to the present invention which has a user interface which may include, among other things, the user interface shown in FIG. 3.

FIG. 4 shows details of one of the terminals 13 of FIG. 1 which is responsive to data packets provided on a line 14a over one of the tunnels 14 shown in FIG. 1 from the RTP mixer 15 of the conference call server 12. The terminal 13 includes means 40 for receiving these data packets on the line 14a for providing the received data packets on a line 42. These data packets may be of the kind described previously The terminal includes means 44 responsive to the data packets provided on the line 42 for recognizing identifiers included in the headers of such packets. In addition, the means for recognizing is able to recognize from the identifiers which data packets include voice data and which include background noise information. It provides this information on a signal line 46 to a means 48 for pointing out to a user identities of terminals providing voice data or identities of terminals providing background noise, or both. It then provides this information on a line 50 to a user interface 52 which is responsive thereto for presenting this identity information in a manner such as shown in FIG. 3 on a display for instance which is output to the user as indicated by signal line 54. It will be understood that the user interface 52 is also responsive to user inputs 56 which may include user key strokes entered into a key pad or keyboard, for instance. Such user inputs can be processed by the user interface or other means within the terminal 13 for providing or retrieving data packets and providing same on a line 58 to means 60 for sending such data packets on a line 14b over the tunnel 14 of FIG. 4 back to the RTP mixer 15 of the conference call server 12 of FIG. 1.

It should be understood that the user inputs 56 will also include other input means such as a microphone used in voice conferencing and for other purposes and that the user interface is able to send this information from the microphone to a coder which in turn packetizes the information received therefrom and causes same to be sent by the means 60 on the line 14b back to the RTP mixer 15 of the conference call server 12 of FIG. 1. The important thing to point out, however, is that the terminal of FIG. 4 includes means for pointing out to the user the identities of terminals providing voice data so that the user can understand who is talking at any given point in time since it may not be easy to determine who among the conference participants is speaking without the advantages of the present invention.

It should be understood that the described embodiment constitutes only one of a variety of possible embodiments of the invention.

What is claimed is:

1. A conference call server comprising:
   a receiver configured to receive data packets from each of a plurality of terminals participating in a conference call; and
   a mixer operatively coupled to the receiver and configured to
      decode the data packets to extract background noise information;
      determine if a data packet from the data packets includes voice data, wherein the data packet is received from a first terminal;
      if the data packet includes the voice data, extract an identifier associated with the first terminal;
      mix the voice data, if any, with the background noise information; and
      provide the mixed voice data and background noise information and the extracted identifier to each of the plurality of terminals in an outbound packet.

2. The conference call server of claim 1, wherein the mixer is further configured to provide a mapping of identifiers to the plurality of terminals.

3. The conference call server of claim 2, wherein the mapping of identifiers associates the identifier associated with the first terminal with a telephone number of the first terminal.

4. The conference call server of claim 2, wherein the mapping of identifiers associates the identifier associated with the first terminal with a session initiation protocol (SIP) address of the first terminal.

5. The conference call server of claim 1, wherein the outbound packet further includes a second identifier corresponding to at least one terminal that transmitted background noise.

6. The conference call server of claim 1, wherein, if the data packet from the first terminal includes the voice data, the outbound packet further includes a marker configured to distinguish the first terminal from a second terminal that transmitted background noise.

7. A method for managing a call comprising:
   decoding, at a computing device, data packets received from each of a plurality of terminals participating in a conference call to extract background noise information;
   determining, at the computing device, if a data packet from the data packets includes voice data, wherein the data packet is received from a first terminal;
   if the data packet includes the voice data, extracting, at the computing device, an identifier associated with the first terminal;
   mixing, at the computing device, the voice data, if any, with the background noise information; and
   providing, from the computing device, the mixed voice data and background noise information and the extracted identifier to each of the plurality of terminals in an outbound packet.

8. The method of claim 7, further comprising providing a mapping of identifiers to the plurality of terminals.

9. The method of claim 8, wherein the mapping of identifiers associates the identifier with a telephone number of the first terminal or with a session initiation protocol (SIP) address of the first terminal.

10. The method of claim 7, wherein the outbound packet further includes a second identifier corresponding to at least one terminal that transmitted background noise.

11. The method of claim 7, further comprising receiving the data packets as one or more real-time transport protocol (RTP) streams.

12. A first terminal comprising:
   means for sending a first data packet to a conference call server, wherein the first data packet includes first background noise information and an identifier associated with the first terminal;
   means for receiving a second data packet from the conference call server, wherein the second data packet includes second background noise information from a second terminal mixed with voice data from a third terminal, wherein the second terminal and the third terminal are participating in a conference call with the first terminal, and further wherein the second data packet includes an active terminal identifier associated with the third terminal, wherein the voice data is included in the second data packet based at least in part on a determination by the conference call server that a third data packet received from the third terminal includes the voice data; and
   means for presenting the active terminal identifier, wherein the active terminal identifier indicates that the third terminal sent the voice data to the conference call server.

13. The first terminal of claim 12, further comprising means for presenting a name associated with the third terminal.

14. The first terminal of claim 12, further comprising means for presenting an image associated with the third terminal.

15. The first terminal of claim 12, further comprising means for receiving a mapping of identifiers from the conference call server, wherein the mapping of identifiers associates the active terminal identifier with the third terminal.

16. The first terminal of claim 12, further comprising means for receiving a marker configured to distinguish the second terminal from third terminal.

17. A non-transitory computer-readable medium having instructions stored thereon, the instructions comprising:
   instructions to send a first data packet to a conference call server, wherein the first data packet includes first background noise information and an identifier associated with a first terminal;
   instructions to receive a second data packet from the conference call server, wherein the second data packet includes second background noise information from a second terminal mixed with voice data from a third terminal, wherein the second terminal and the third terminal are participating in a conference call with the first terminal, and further wherein the second data packet includes an active terminal identifier associated with the third terminal, wherein the voice data is included in the second data packet based at least in part on a determination by the conference call server that a third data packet received from the third terminal includes the voice data; and
   instructions to present the active terminal identifier, wherein the active terminal identifier indicates that the third terminal sent the voice data to the conference call server.

18. The non-transitory computer-readable medium of claim 17, further comprising instructions to receive a mapping of identifiers from the conference call server, wherein the mapping of identifiers associates the active terminal identifier with the third terminal.

19. The non-transitory computer-readable medium of claim 17, further comprising instructions to present an image on a display, wherein the image is associated with the third terminal.

20. The non-transitory computer-readable medium of claim 17, further comprising instructions to present a name on a display, wherein the name is associated with the third terminal.

21. The non-transitory computer-readable medium of claim 17, further comprising instructions to present a telephone number on a display, wherein the telephone number is associated with the third terminal.

* * * * *

UNITED STATES PATENT AND TRADEMARK OFFICE
CERTIFICATE OF CORRECTION

| | |
|---|---|
| PATENT NO. | : 8,169,937 B2 |
| APPLICATION NO. | : 12/348445 |
| DATED | : May 1, 2012 |
| INVENTOR(S) | : Kuusinen et al. |

It is certified that error appears in the above-identified patent and that said Letters Patent is hereby corrected as shown below:

On the Face Page, in Field (75), under "Inventors", in Column 1, Line 1, delete "Jyvaskyla" and insert -- Jyväskylä --, therefor.

On the Face Page, in Field (57), under "ABSTRACT", in Column 2, Line 15, delete "a," and insert -- a --, therefor.

In Column 1, Line 60, delete "speech.codec" and insert -- speech codec --, therefor.

In Column 6, Line 17, delete "header; and" and insert -- header; --, therefor.

In Column 6, Line 20, delete "invention." and insert -- invention; and --, therefor.

In Column 7, Line 62, delete "header" and insert -- header. --, therefor.

In Column 8, Line 27, delete "previously" and insert -- previously. --, therefor.

Signed and Sealed this
Eighteenth Day of September, 2012

David J. Kappos
*Director of the United States Patent and Trademark Office*